(12) United States Patent
Laskaris et al.

(10) Patent No.: US 7,312,544 B2
(45) Date of Patent: Dec. 25, 2007

(54) FLUID TRANSFER DEVICE AND METHOD FOR CONVEYING FLUID TO A ROTATING MEMBER

(75) Inventors: Evangelos Trifon Laskaris, Niskayuna, NY (US); Bharat Sampathkumaran Bagepalli, Niskayuna, NY (US); James William Bray, Niskayuna, NY (US); Aniruddha Dattatraya Gadre, Rexford, NY (US)

(73) Assignee: General Electric Company, Schenectady, NY (US)

( * ) Notice: Subject to any disclaimer, the term of this patent is extended or adjusted under 35 U.S.C. 154(b) by 412 days.

(21) Appl. No.: 10/906,341

(22) Filed: Feb. 15, 2005

(65) Prior Publication Data

US 2006/0182621 A1    Aug. 17, 2006

(51) Int. Cl.
   *H02K 9/00* (2006.01)
(52) U.S. Cl. .............................. 310/61; 310/52; 310/59
(58) Field of Classification Search ............ 310/52–59, 310/60 A, 61–63
   See application file for complete search history.

(56) References Cited

U.S. PATENT DOCUMENTS

| | | | |
|---|---|---|---|
| 4,018,059 A | | 4/1977 | Hatch |
| 4,035,678 A | * | 7/1977 | Lambrecht et al. ............ 310/52 |
| 4,056,745 A | * | 11/1977 | Eckels ......................... 310/52 |
| 4,079,273 A | * | 3/1978 | Lambrecht et al. ............ 310/52 |
| RE30,302 E | | 6/1980 | Stanislaw |
| 5,331,819 A | * | 7/1994 | Matsuda et al. .............. 62/51.1 |
| 6,313,556 B1 | * | 11/2001 | Dombrovski et al. ......... 310/91 |
| 6,351,045 B1 | * | 2/2002 | Shoykhet ..................... 310/52 |
| 6,376,943 B1 | * | 4/2002 | Gamble et al. ............... 310/52 |
| 6,412,289 B1 | | 7/2002 | Laskaris et al. ............. 62/50.7 |
| 6,577,028 B2 | | 6/2003 | Laskaris et al. ............. 310/64 |

FOREIGN PATENT DOCUMENTS

| | | |
|---|---|---|
| DE | 4133262 A1 | 4/1993 |
| EP | 1583210 A2 | 5/2005 |
| JP | 6194558 | 5/1986 |

OTHER PUBLICATIONS

European Patent Office Search Report, Application No. 06250689.4-2207, Sep. 29, 2006.

* cited by examiner

*Primary Examiner*—Thanh Lam
(74) *Attorney, Agent, or Firm*—Cantor Colburn LLP

(57) ABSTRACT

A fluid transfer device and a method for conveying a fluid from a fluid transfer device to a rotating member are provided. The fluid transfer device includes a housing disposed around a first rotating member extending along an axis. The housing has a first plurality of apertures extending therethrough that communicate with the fluid source. The first rotating member has a second plurality of passageways extending from a first exterior surface of the first rotating member to a third passageway extending generally axially within the first rotating member. Further, at least a portion of the second plurality of passageways communicate with at least a portion of the first plurality of apertures, wherein the fluid flows through the first plurality of apertures and the second plurality of passageways to the third passageway in the first rotating member.

15 Claims, 5 Drawing Sheets

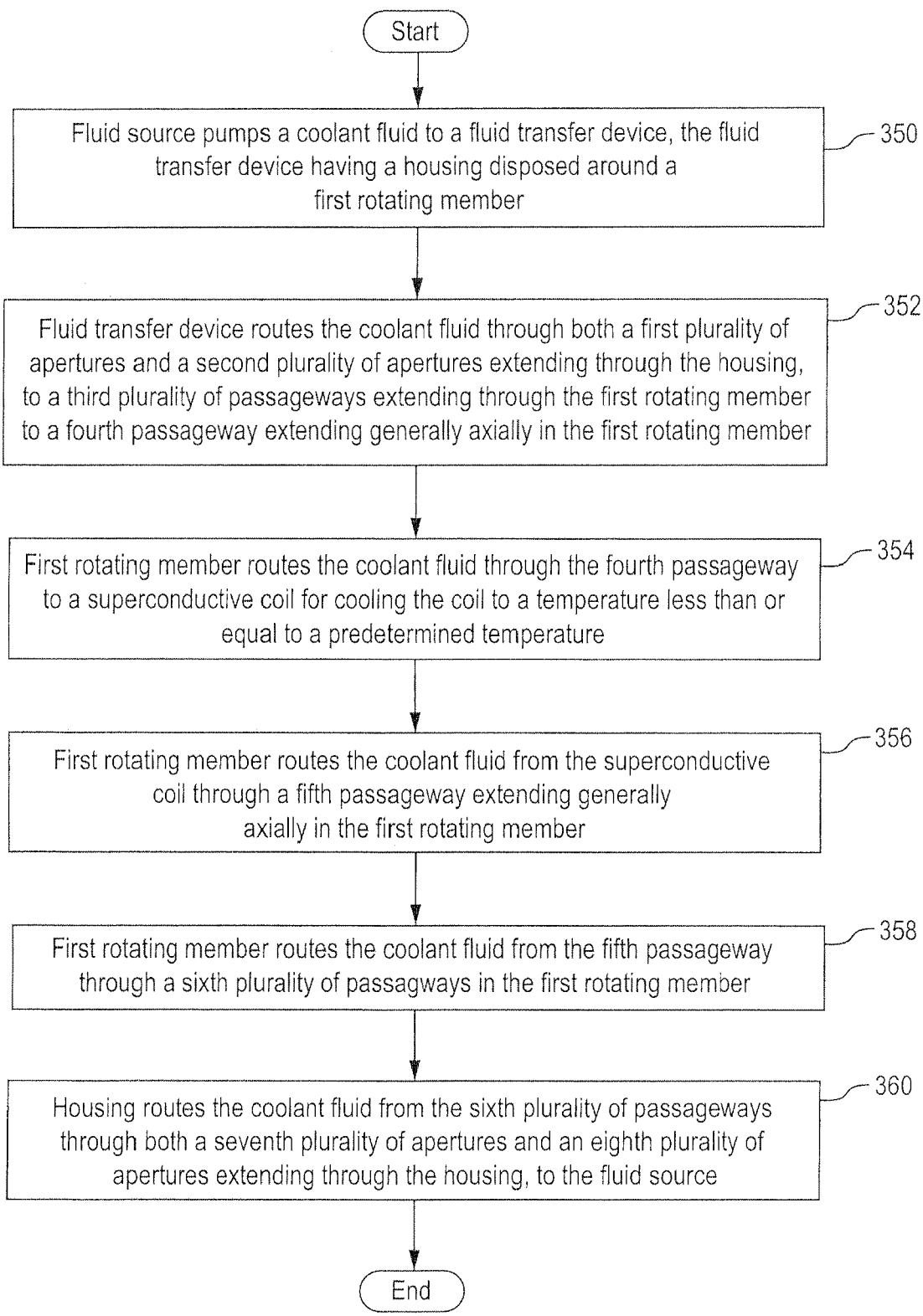

FLUID TRANSFER DEVICE AND METHOD FOR CONVEYING FLUID TO A ROTATING MEMBER

BACKGROUND OF THE INVENTION

Rotating electrical machines, such as motors and generators, have a rotor and a stator that are magnetically coupled. Generally, the rotor has a coil that is used to produce a magnetic field. In particular, electricity flowing through the rotor coil produces the magnetic field. In a generator, the rotor is coupled to a prime mover that rotates the rotor, producing a rotating magnetic field that induces a voltage in the stator. The voltage produced in the stator is used to supply power to an electrical grid. Alternately, in a motor, the stator produces a rotating magnetic field that interacts with the magnetic field produced by the rotor coil to induce rotation of the rotor.

Conventional copper conductors are commonly used to form the rotor coils. However, the electrical resistance of copper is sufficient to produce a substantial amount of resistant heat loss in the rotor coil, which reduces the efficiency of the rotating machine. In response to the losses caused by conventional copper conductors, superconductors have been developed for use as rotor coils. A superconductor is a material that loses its electrical resistance below a predetermined transition temperature, making it desirable for use as a rotor coil.

In a rotating machine utilizing a superconductive rotor coil, the rotor coil is cooled by a cryogenic fluid to lower the temperature of the superconductive coil below the transition temperature. Below the transition temperature, the superconductive rotor coil enters a superconductive state and loses its electrical resistance. Generally, a cryogenic fluid is provided to the superconductive coil by an external source of cryogenic fluid. The cryogenic fluid absorbs heat from the superconductive rotor coil, which maintains the rotor coil below the transition temperature and in the superconductive state. The cryogenic fluid for cooling the superconductive rotor coil is transferred between the source of cryogenic fluid and the rotor by a transfer coupling located at one end of the rotor shaft.

However, a number of problems are associated with transferring cryogenic fluid through the end of the rotor shaft. For example, a generator may be disposed between two turbines. In this configuration, neither end of the rotor shaft is accessible to supply cryogenic fluid to the rotor coil.

Thus, there is a need for improved device for conveying a coolant fluid to a rotating device.

BRIEF DESCRIPTION OF THE INVENTION

A fluid transfer device for conveying a fluid from a fluid source to a rotating member in accordance with an exemplary embodiment is provided. The fluid transfer device includes a housing disposed around a first rotating member extending along an axis, the housing having a first plurality of apertures extending therethrough that communicate with the fluid source. The first rotating member has a second plurality of passageways extending from a first exterior surface of the first rotating member to a third passageway extending generally axially within the first rotating member. Further, at least a portion of the second plurality of passageways communicate with at least a portion of the first plurality of apertures, wherein the fluid flows through the first plurality of apertures and the second plurality of passageways to the third passageway in the first rotating member.

A method for conveying a fluid from a fluid source to a rotating member in accordance with another exemplary embodiment is provided. The method includes supplying the fluid from the fluid source to a housing disposed around a first rotating member. The method further includes routing the fluid through a plurality of apertures extending through a housing to a first plurality of passageways extending through the first rotating member to a second passageway extending generally axially in the first rotating member.

A fluid transfer device for conveying a fluid from a fluid source to a rotating member in accordance with another exemplary embodiment is provided. The fluid transfer device includes a housing disposed around a first rotating member means extending along an axis. The housing has a first plurality of apertures extending therethrough that communicate with the fluid source. The first rotating member means rotates about the axis relative to the housing. The first rotating member means has a second plurality of passageways extending from a first exterior surface of the first rotating member means to a third passageway extending generally axially within the first rotating member means. Further, at least a portion of the second plurality of passageways communicate with at least a portion of the first plurality of apertures, wherein the fluid flows through the first plurality of apertures and the second plurality of passageways to the third passageway in the first rotating member means.

Other systems and/or methods according to the embodiments will become or are apparent to one with skill in the art upon review of the following drawings and detailed description. It is intended that all such additional systems and methods be within the scope of the present invention, and be protected by the accompanying claims.

BRIEF DESCRIPTION OF THE DRAWINGS

FIG. 6 is a flowchart of a method for transferring a coolant fluid from a fluid source to a rotating member in accordance with another exemplary embodiment.

DETAILED DESCRIPTION OF THE INVENTION

Figure 1:
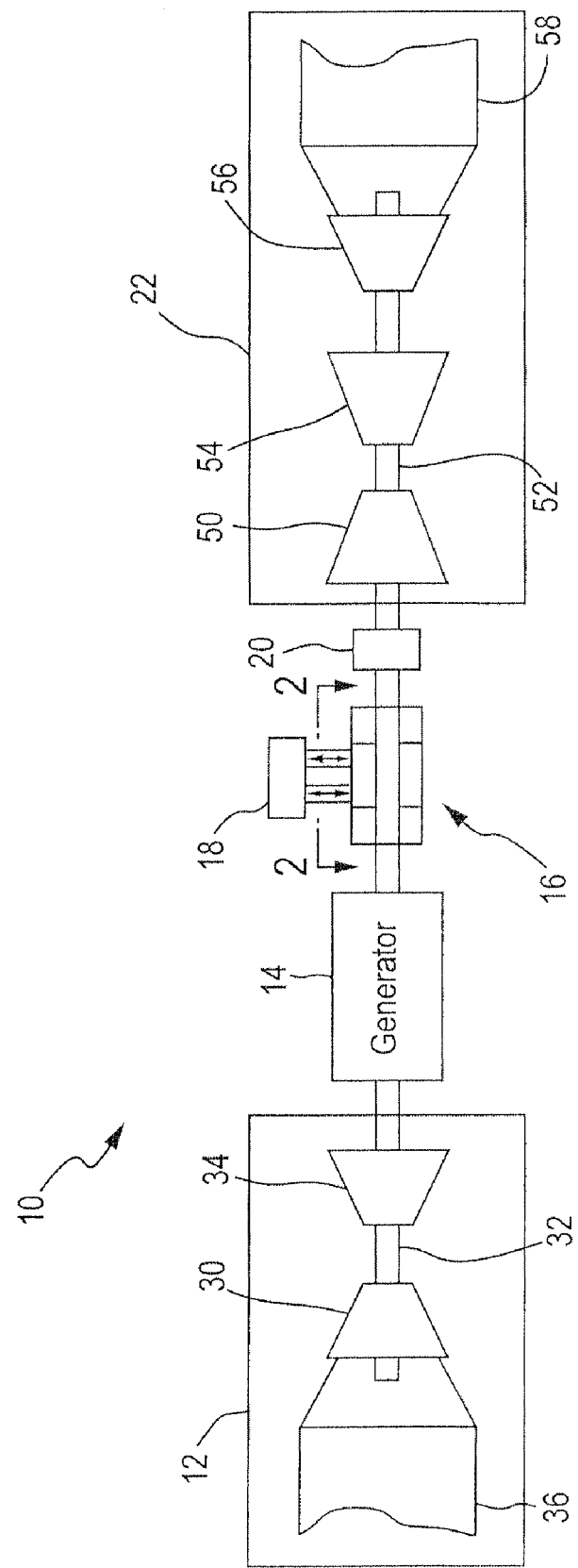
FIG. 1 is a schematic of a power generation system having a fluid transfer device in accordance with an exemplary embodiment.

Referring to FIG. 1, a power generation system 10 is illustrated. The power generation system 10 includes a gas turbine system 12, a generator 14, a fluid transfer device 16, a fluid source 18, a flexible coupling 20, and a steam turbine 22. The fluid transfer device 16 is utilized to transfer a coolant fluid from the fluid source 18 into an interior anterior region of the generator 14, as will be explained in greater detail below.

The gas turbine system 12 is provided to combust a gas therein to rotate a rotatable shaft 32 for subsequently generating electricity. The gas turbine system 12 includes a gas turbine 30, the rotatable shaft 32, a compressor 34, and a heat recovery tube 36. The gas turbine 30 is operably coupled to the compressor 34 via the rotatable shaft 32. Further, the gas turbine 30 converts energy produced by combustion of a gas into rotational motion of the shaft 32 and of the compressor 34. The rotating compressor 34 increases a pressure of the air flowing into the gas turbine 30 for improved combustion of gases in the gas turbine 30.

Figure 5:
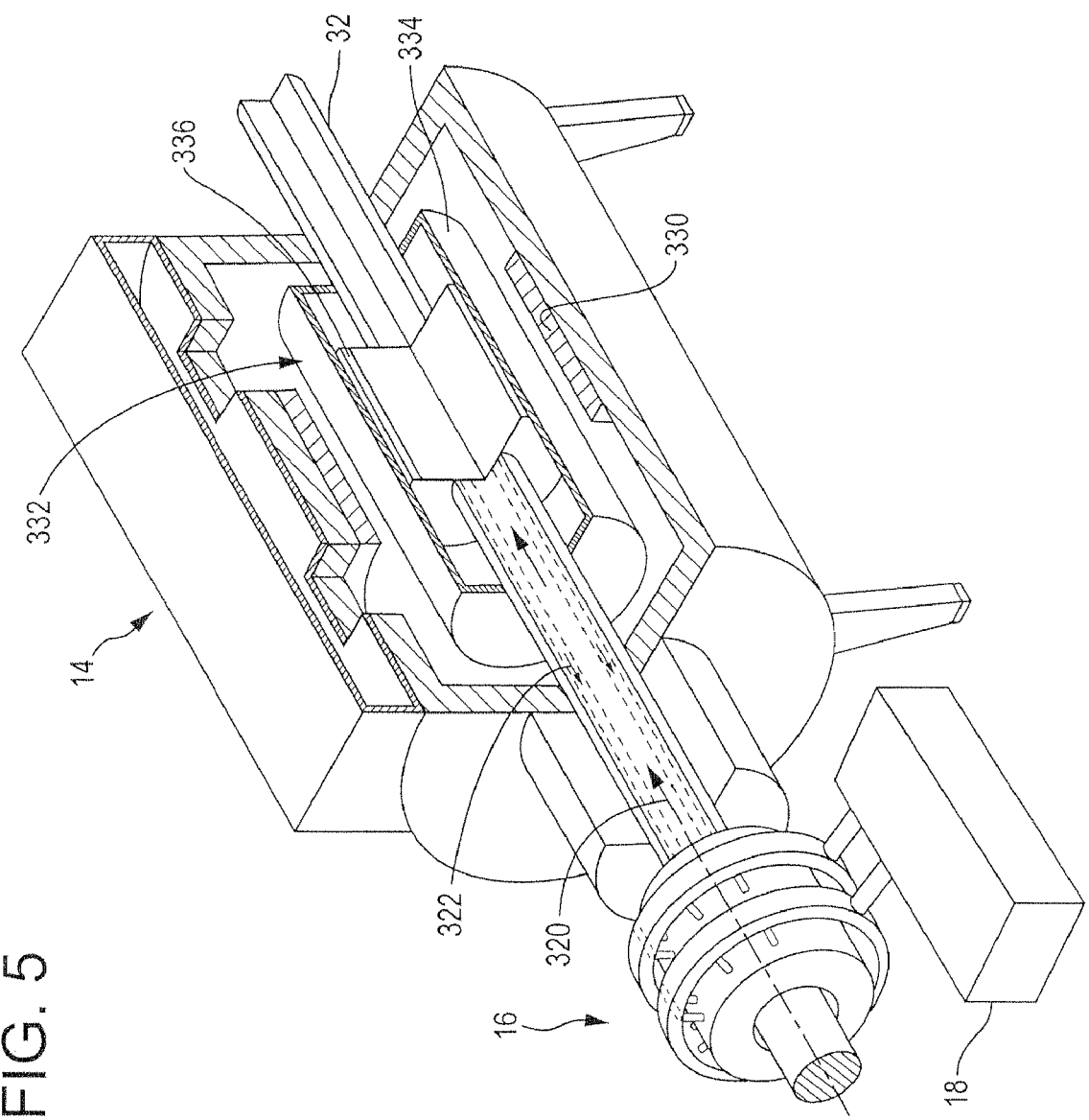
FIG. 5 is a schematic of the fluid transfer device and a generator utilized in the power generation system of FIG. 1.

Referring to FIGS. 1 and 5, the generator 14 is provided to generate electricity in response to the rotating shaft 32. The generator 14 includes a stator 330 and a rotor 332. The rotor 332 includes a vacuum jacket 334 that surrounds a superconductive rotor coil 336. The stator 330 is operably disposed around the rotor 332. When the rotor 332 rotates within the stator 330, an electrical current within the superconductive coil 336 generates a magnetic field that induces a voltage within the stator 330. The generator 14 is operably coupled to the gas turbine system 12 via the rotatable shaft 32. Further, the rotatable shaft 32 extends from the generator 14 through the fluid transfer device 16 to the flexible coupling 20.

Referring to FIG. 1, the steam turbine 22 is provided to improve the efficiency of the power generation system 10 by using steam produced by the combustion products generated by the gas turbine system 12. The steam turbine 22 includes a high-pressure module 50, a shaft 52, an intermediate pressure module 54, a low-pressure module 56, and a condenser 58. The high-pressure module 50, the intermediate pressure module 54, and the low-pressure module 56 are operably coupled to the shaft 52. During operation, the heat recovery tube 36 of the gas turbine extracts heat from the combustion products produced by the gas turbine 30. The liquid condensate from the condenser 58 of the steam turbine 22 is pumped to the heat recovery tube 36. Thereafter, the liquid condensate is heated within the heat recovery tube 36 to produce steam. Thereafter, the steam is supplied to the high-pressure module 50. The steam flows through the high-pressure module 50, the intermediate pressure module 54, and the low-pressure module 56 to induce rotation of the shaft 52. Further, as the steam flows through the high-pressure module 50, the intermediate pressure module 54, and the low-pressure module 56, the steam loses pressure. After the steam flows through the low-pressure module 56, the steam is condensed into a liquid by the condenser 58. The high-pressure module 50 operably communicates with the heat recovery tube 36 of the gas turbine system 12. The shaft 52 of the steam turbine 22 is coupled to the shaft 32 of the gas turbine system 12 by the flexible coupling 20. The flexible coupling 20 couples the shafts 52, 32, while enabling the shafts 52, 32 to have a degree of relevant movement with respect to one another.

Figure 2:
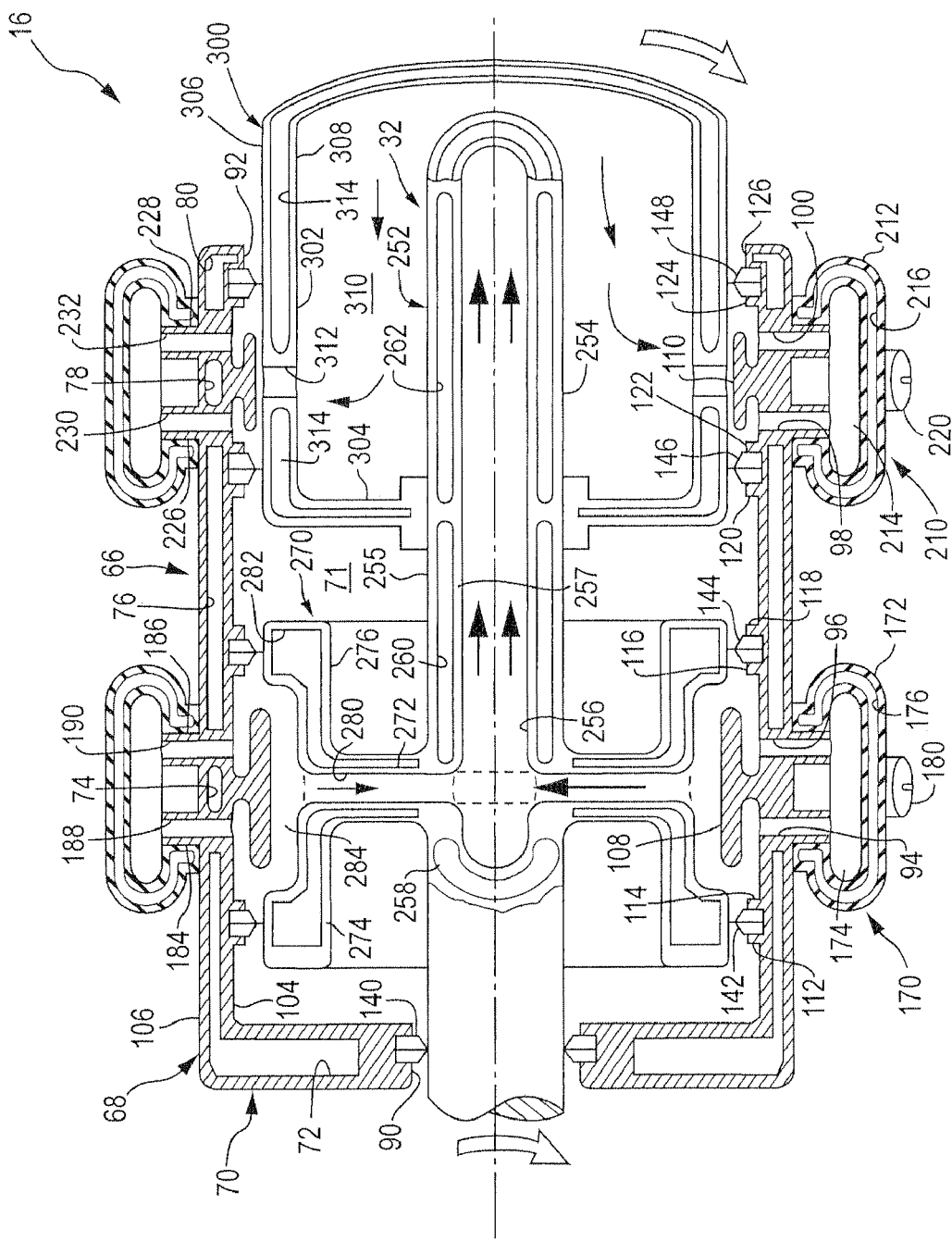
FIG. 2 is a cross-sectional schematic of the fluid transfer device of FIG. 1.
Figure 3:
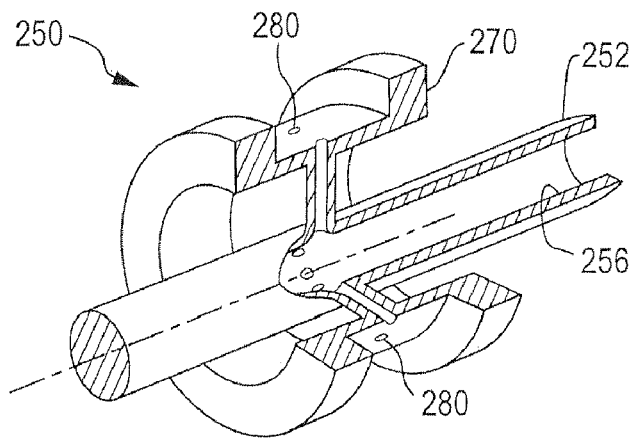
FIG. 3 is a perspective view of a rotating member utilized in the fluid transfer device of FIG. 1.
Figure 4:
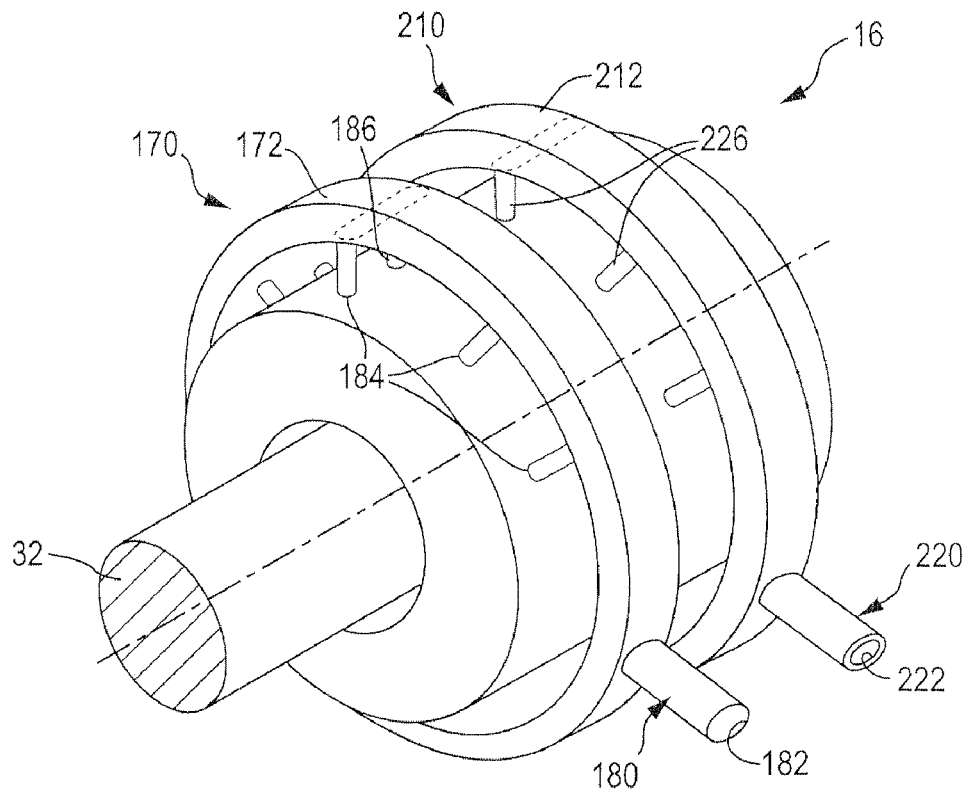
FIG. 4 is a perspective view of the fluid transfer device of FIG. 1.

Referring to FIGS. 2-4, a fluid transfer device 16 for transferring a coolant fluid from the fluid source 18 to the generator 14 in accordance with an exemplary embodiment is illustrated. The fluid transfer device 16 includes a housing 66, a fluid receiving member 170, a fluid output member 210, and the shaft 32.

The housing 66 is provided to enclose a portion of the rotatable shaft 32. The housing 66 includes wall portions 68, 70, baffle portions 108, 110, and tab portions 112, 114, 116, 118, 120, 122, 124, 126, and seals 140, 142, 144, 146, and 148. The wall portions 68, 70 are constructed from aluminum and define an interior region 71 of the housing 66. Of course, wall portions 68, 70 can be constructed from a plurality of other materials including metals and plastics. The wall portions 68, 70 include cavities 72, 74, 76, 78, and 80 therein. The cavities 72, 74, 76, 78, 80 are vacuum evacuated or filled with a thermally nonconductive material for reducing an amount of heat energy transferred to the coolant fluid through the wall portions 68, 70. The wall portion 70 includes an aperture 90 extending therethrough configured to receive the rotatable shaft 32. The shaft 32 extends through the aperture 90 into the interior region 71 of the housing 66. The wall portion 70 further includes an aperture 92 extending therethrough at an end of the housing 66 opposite the aperture 90. A portion of the shaft 32 further extends through the aperture 92 of the housing 66. The wall portion 70 further includes a groove 90 proximate the aperture 90 configured to receive a seal 140 that seals against an exterior surface of the shaft 32.

Referring to FIG. 2, the wall portion 68 includes a plurality of apertures 94 extending therethrough and a plurality of apertures 96 extending therethrough for communicating a coolant fluid therethrough into the housing 66. The plurality of apertures 94 are disposed circumferentially around the outer surface 106 of the wall portion 68. The plurality of apertures 96 are also disposed circumferentially around the outer surface 106 of the wall portion 68. Each aperture of the plurality of apertures 96 is disposed proximate one aperture of the plurality of apertures 94. The wall portion 68 further includes a plurality of apertures 98 extending therethrough and a plurality of apertures 100 extending therethrough for expelling the coolant fluid therethrough from the housing 66. The plurality of apertures 98 are disposed circumferentially around the outer surface 106 of the wall portion 68. The plurality of apertures 100 are also disposed circumferentially around the outer surface 106 of the wall portion 68. Each aperture of the plurality of apertures 100 is disposed proximate one aperture of the plurality of apertures 98.

The baffle portion 108 is provided to reduce turbulence in a coolant fluid as the coolant fluid flows through the plurality of apertures 94, 96 and past the baffle portion 108. The baffle portion 108 extends from the inner surface 104 of the wall portion 68 into the interior region 71 of the housing 66. The baffle portion 108 has a substantially T-shaped cross-sectional profile and extends circumferentially around the interior surface 104 of the wall portion 68. The plurality of apertures 94 are disposed proximate a first side of the baffle portion 108 and the plurality of apertures 96 are disposed on a second side of the baffle portion 108.

The baffle portion 110 is provided to reduce turbulence in the coolant fluid as the coolant fluid flows around the baffle portion 110 and through the plurality of apertures 98, 100. The baffle portion 110 extends from the inner surface 104 of the wall portion 68 into the interior region 71 of the housing 66. The baffle portion 110 has a substantially T-shaped cross-sectional profile and extends circumferentially around the interior surface 104 of the wall portion 68. The plurality of apertures 98 are disposed proximate a first side of the baffle portion 110 and the plurality of apertures 100 are disposed on a second side of the baffle portion 110.

The tab portions 112, 114 extend from the inner surface 104 of the wall portion 68 into the interior region 71 of the housing 66. The tab portions 112, 114 are disposed proximate the plurality of apertures 94 of the wall portion 68. Further, the tab portions 112, 114 are configured to receive the seal 142 therebetween and to extend circumferentially around the interior surface 104 of the housing 66. The seal 142 is configured to contact a portion of the Y-shaped flange 270 of the rotating member 32.

The tab portions 116, 118 extend from the inner surface 104 of the wall portion 68 into the interior region 71 of the housing 66. The tab portions 116, 118 are disposed proximate the plurality of apertures 96 of the wall portion 68. Further, the tab portions 116, 118 are configured to receive the seal 144 therebetween and to extend circumferentially around the interior surface 104 of the housing 66. The seal 144 is configured to contact a portion of the Y-shaped flange 270 of the rotating member 32.

The tab portions 120, 122 extend from the inner surface 104 of the wall portion 68 into the interior region 71 of the housing 66. The tab portions 120, 122 are disposed proximate the plurality of apertures 98 of the wall portion 68. Further, the tab portions 120, 122 are configured to receive the seal 146 therebetween and to extend circumferentially around the interior surface 104 of the housing 66. The seal 144 is configured to contact a portion of the conduit portion 300.

The tab portions 124, 126 extend from the inner surface 104 of the wall portion 68 into the interior region 71 of the housing 66. The tab portions 124, 126 are disposed proximate the plurality of apertures 100 of the wall portion 68. Further, the tab portions 124, 126 are configured to receive the seal 148 therebetween and to extend circumferentially around the interior surface 104 of the housing 66. The seal 148 is configured to contact a portion of the conduit portion 300.

The seals 140, 142, 144, 146, 148 are provided to seal between stationary members and rotating members. The seals 140, 142, 144, 146, 148 comprise ferro-fluidic seals. Of course, in an alternate embodiment of the fluid transfer device 16, alternate types of seals can be utilized. For example, Kevlar brush seals or Labyrinthine seals can be utilized instead of ferro-fluidic seals in the fluid transfer device 16.

Referring to FIGS. 2 and 4, the fluid receiving member 170 of the fluid transfer device 16 is provided to route fluid from the fluid source 18 into the plurality of apertures 94, 96 in the housing 66. The fluid receiving member 170 includes a ring portion 172, a tubular member 180, and a plurality of conduits 184, 186.

The ring portion 170 is substantially ring-shaped and extends circumferentially around the housing 66. The ring portion 170 includes an aperture 174 that extends within the ring portion 170 substantially 360° around the ring portion 170. The ring portion 170 further includes a cavity 176 disposed therein that is vacuum evacuated or filled with a thermally nonconductive material wherein a relatively thin wall is disposed between the cavity 176 and the aperture 174.

The tubular member 180 is operably coupled to the ring portion 170 to route coolant fluid from the fluid source 18 into the aperture 174 of the ring portion 172. The tubular member 180 includes an aperture 182 that extends therethrough and communicates with the aperture 170 of the ring portion 172.

The plurality of conduits 184, 186 extend between the ring portion 170 and the housing 66. The plurality of conduits 184, 186 are provided to route coolant fluid from the ring portion 172 into the plurality of apertures 94, 96 of the housing 66. Each conduit of the plurality of conduits 184 includes an aperture 188 extending therein. Each aperture 188 communicates with (i) a corresponding aperture of the plurality of apertures 94, 96 in wall portion 68, and (ii) the aperture 174 of the ring portion 172. Each conduit of the plurality of conduits 186 includes an aperture 190 extending therein. Each aperture 190 communicates with (i) a corresponding aperture of the plurality of apertures 96 in the wall portion 68, and (ii) the aperture 174 of the ring portion 172.

The fluid output member 210 is provided to route fluid from the plurality of apertures 98, 100 in the housing 66 to the fluid source 18. The fluid output member 210 includes a ring portion 212, a tubular member 220, and a plurality of conduits 226, 228.

The ring portion 212 is substantially ring-shaped and extends circumferentially around the housing 66. The ring portion 212 includes an aperture 214 that extends within the ring portion 212 substantially 360° around the ring portion 212. The ring portion 212 further includes a cavity 216 disposed therein that is vacuum evacuated or filled with a thermally non-conductive material wherein a relatively thin wall is disposed between the cavity 216 and the aperture 214.

The tubular member 220 is operably coupled to the ring portion 212 to output coolant fluid from the generator 14 and to route the coolant fluid to the fluid source 18. The tubular member 220 includes an aperture 222 that extends therethrough and communicates with the aperture 214 of the ring portion 212.

The plurality of conduits 226, 228 extend between the ring portion 212 and the housing 66. The plurality of conduits 226, 228 are provided to route coolant fluid from the plurality of apertures 98, 100 of the housing 66 into the tubular member 220. Each conduit of the plurality of conduits 226 includes an aperture 230 extending therein. Each aperture 230 communicates with (i) a corresponding aperture of the plurality of apertures 98 in the wall portion 68, and (ii) the aperture 214 of the ring portion 212. Each conduit of the plurality of conduits 228 includes an aperture 232 extending therein. Each aperture 232 communicates with (i) a corresponding aperture of the plurality of apertures 100 in the wall portion 68, and (ii) the aperture 214 of the ring portion 212.

It should be noted that the tubular members 180, 220 and the plurality of conduits 184, 186, 226, 228 include (i) double-walls wherein a vacuum region is disposed between the double-walls and (ii) a radiation-reduction insulation (e.g. MLI or Ag plating disposed on one wall of double-walls proximate the vacuum region that has a temperature greater than the opposing wall of the double-walls.

Referring to FIG. 2, the rotating member 32 is provided to route coolant fluid from the fluid source 18 to the generator 14 as well as a usual function of transferring rotational energy to the generator 14. The rotating member 32 includes a conduit portion 252, a Y-shaped flange 270, and a conduit portion 300.

The conduit portion 252 includes at outer wall 254 defining a passageway 256. The outer wall 254 includes at outer surface 255 and an inner surface 257. The outer wall 254 further includes cavities 258, 260, 262 disposed therein. The cavities 258, 260, 262 are filled with a thermally non-conductive material or a vacuum, or both.

The Y-shaped flange 270 extends outwardly from the conduit portion 252 and is configured to route coolant fluid from the apertures 94, 96 and the apertures 188, 190 to the passageway 256 of the conduit portion 252. The Y-shaped flange 270 includes an annular member 272 and extension members 274, 276. The annular member 272 extends outwardly from the outer surface 255 of the conduit portion 252 and extends circumferentially around the conduit portion 252. The extension members 274, 276 extend generally perpendicular to the annular member 272 opposite from one another. The annular member 272 includes a plurality of apertures 280 extending therethrough for routing coolant fluid from the apertures 94, 96 through the apertures 280 to the passageway 256 of the conduit portion 252. The annular member 272 and the extension member 274 include a cavity 282 disposed therein that is vacuum evacuated or filled with a thermally nonconductive material. The annular member 272 and the extension member 276 further include a cavity 283 disposed therein that is vacuum evacuated or filled with a thermally non-conductive material. The annular member 272 and the extension members 274, 276 are disposed proximate the seals 142, 144 to form an enclosed region 284 for receiving fluid therein. The region 284 communicates indicates with both the passageway 256 of the conduit portion 252 and the plurality of apertures 94, 96.

The conduit portion 300 is provided to route coolant fluid from the generator 14 to the plurality of apertures 98, 100 in the housing 66. The conduit portion 300 includes at outer wall 302 and an end wall 304. The end wall 304 is coupled between the conduit portion 252 and the outer wall 302. The conduit portion 300 has a diameter that is greater than the diameter of the conduit portion 32. Further, the outer wall 302, the end wall 304, and the outer surface of the conduit portion 32 define a passageway 310 for receiving coolant fluid from the generator 14. The outer wall 302 includes an outer surface 306 and an inner surface 308. Further, the outer wall 302 includes a plurality of apertures 312 extending therethrough. The plurality of apertures 312 are disposed circumferentially around the outer wall 302 for communicating coolant fluid from the passageway 310 to the plurality of apertures 98, 100 in the housing 66. The outer wall 302 and the end wall 304 have a cavity 314 therein that is vacuum evacuated or filled with a thermally nonconductive material. The outer wall 302 contacts the seals 146, 148 as the outer wall 302 rotates to prevent coolant fluid leakage.

The fluid source 18 is configured to store the coolant fluid therein and to cool the coolant fluid below a predetermined super-conducting temperature of the generator 14. In an exemplary embodiment, the coolant fluid comprises one or more of a helium fluid, a neon fluid, a hydrogen fluid, and a nitrogen fluid. Of course, in alternate embodiments, other types of coolant fluids could be utilized, such as water for example. The fluid source 18 is further provided to route the coolant fluid to the fluid transfer device 16 and to receive coolant fluid from the fluid transfer device 16. In particular, the fluid source 18 pumps the coolant fluid through the conduit member 180 into the fluid transfer device 16 for cooling the generator 14. Further, the fluid source 18 receives the heated coolant fluid from the conduit member 220 and cools the coolant fluid therein.

All of the conduits and members communicating coolant fluid therethrough described above can have a layer of radiation-reduction insulation not shown. The radiation-reduction insulation can comprise MLI, Ag, or other low emissivity materials having emissivity values less than 0.05, for example. The radiation-reduction insulation lowers the emissivity of a relatively high temperature surface, thereby reducing its radiation and thermal conduction through the conduit or member.

Referring to FIG. 6, a method for conveying a coolant fluid from a fluid source to the generator 14 utilizing the fluid transfer device 16 will now be described.

At step 350, the fluid source 18 pumps the coolant fluid to the fluid transfer device 16.

At step 352, the fluid transfer device 16 routes the coolant fluid through both a plurality of apertures 94 and the plurality of apertures 96 extending through the housing 66, to a plurality of apertures or passageways 280 extending through the rotating member 32 to a passageway 256 extending generally axially in the rotating member 32.

At step 354, the rotating member 32 routes the coolant fluid through the passageway 256 to a superconductive coil 336 for cooling the coil 336 to a temperature less than or equal to a predetermined temperature.

At step 356, the rotating member 32 routes the coolant fluid from the superconductive coil 336 through a passageway 310 extending generally axially in the rotating member 32.

At step 358, the rotating member 32 routes the coolant fluid from the passageway 310 through the plurality of passageways or apertures 312 in the rotating member 32.

At step 360, the housing 66 routes the coolant fluid from plurality of passageways 312 through both a plurality of apertures 98 and a plurality of apertures 100 extending through the housing 66, to the fluid source 18.

The fluid transfer device and the method for conveying a coolant fluid from a fluid source to a rotating member represent a substantial advantage over other systems and methods. In particular, the fluid transfer device and the method provide a technical effect of transferring a coolant fluid to a rotating member at a position other than an end position of the rotating member. Thus, the fluid transfer device can be disposed between two ends of a rotating member and route the coolant fluid to the rotating member.

While the invention is described with reference to an exemplary embodiment, it will be understood by those skilled in the art that various changes may be made an equivalence may be substituted for elements thereof without departing from the scope of the invention. In addition, many modifications may be made to the teachings of the invention to adapt to a particular situation without departing from the scope thereof. Therefore, is intended that the invention not be limited the embodiment disclosed for carrying out this invention, but that the invention includes all embodiments falling with the scope of the intended claims. Moreover, the use of the term's first, second, etc. does not denote any order of importance, but rather the term's first, second, etc. are us are used to distinguish one element from another.

What is claimed is:

1. A fluid transfer device for conveying a fluid from a fluid source to a rotating member, comprising:

a housing disposed around a first rotating member extending along an axis, the housing having a first plurality of apertures extending therethrough that communicate with the fluid source; and the first rotating member having a second plurality of passageways extending from a first exterior surface of the first rotating member to a third passageway extending generally axially within the first rotating member, at least a portion of the second plurality of passageways communicating with at least a portion of the first plurality of apertures, wherein the fluid flows through the first plurality of apertures and the second plurality of passageways to the third passageway in the first rotating member.

2. The device of claim 1, wherein the first plurality of apertures of the housing are disposed circumferentially around the housing.

3. The device of claim 1, wherein the housing has a fourth plurality of apertures extending therethrough, each aperture of the fourth plurality of apertures being disposed proximate one aperture of the first plurality of apertures, the housing further having at least a first baffle portion coupled to an inner surface of the housing, the first baffle portion being disposed proximate at least one aperture of the fourth plurality of apertures and one aperture of the first plurality of apertures for reducing turbulence in the fluid when the fluid flows past the first baffle portion.

4. The device of claim 1, wherein the first rotating member further comprises a fourth passageway extending generally axially in the first rotating member configured to receive the fluid from the third passageway, and a fifth plurality of apertures extending from a second exterior surface of the first rotating member to the fourth passageway, and the housing further having a sixth plurality of apertures extending therethrough that communicate with both the fluid source and the fifth plurality of apertures in the first rotating member, the coolant fluid flowing from the fourth passageway in the first rotating member and through the fifth plurality of apertures in the first rotating member and the sixth plurality of apertures in the housing to the fluid source.

5. The device of claim 4, wherein the housing further comprises a seventh plurality of apertures extending therethrough, each aperture of the seventh plurality of apertures being disposed proximate one aperture of the sixth plurality of apertures, the housing further having at least a first baffle portion coupled to an inner surface of the housing, the first baffle portion being disposed proximate at least one aperture of the seventh plurality of apertures and one aperture of the sixth plurality of apertures for reducing turbulence in the fluid when the fluid flows past the first baffle portion.

6. The device of claim 4, wherein the sixth plurality of apertures are disposed circumferentially around the housing.

7. The device of claim 1, wherein the first rotating member is operably coupled to a superconductive rotor coil wherein the third passageway routes fluid to the coil for cooling the coil to a temperature less than or equal to a predetermined temperature.

8. The device of claim 1, wherein the fluid source supplies the fluid at a predetermined pressure to the housing.

9. The device of claim 1, further comprising at least a first sealing member operably coupled between the housing and the first rotating member.

10. The device of claim 9, wherein the first sealing member comprises at least one of a ferro-fluidic seal, a brush seal, and a labyrinthine seal.

11. The device of claim 9, wherein the fluid comprises a coolant fluid.

12. The device of claim 11, wherein the coolant fluid comprises at least one of a helium fluid, a neon fluid, a hydrogen fluid, and a nitrogen.

13. A fluid transfer device for conveying a fluid from a fluid source to a rotating member, comprising:

a housing disposed around a first rotating member means extending along an axis, the housing having a first plurality of apertures extending therethrough that communicate with the fluid source; and the first rotating member means for rotating about the axis relative to the housing, the first rotating member means having a second plurality of passageways extending from a first exterior surface of the first rotating member means to a third passageway extending generally axially within the first rotating member means, at least a portion of the second plurality of passageways communicating with at least a portion of the first plurality of apertures, wherein the fluid flows through the first plurality of apertures and the second plurality of passageways to the third passageway in the first rotating member means.

14. The device of claim 13, wherein the first plurality of apertures of the housing are disposed circumferentially around the housing.

15. The device of claim 13, wherein the housing has a fourth plurality of apertures extending therethrough, each aperture of the fourth plurality of apertures being disposed proximate one aperture of the first plurality of apertures, the housing further having at least a first baffle portion coupled to an inner surface of the housing, the first baffle portion being disposed proximate at least one aperture of the fourth plurality of apertures and one aperture of the first plurality of apertures for reducing turbulence in the fluid when the fluid flows past the first baffle portion.

* * * * *